US012745792B2

(12) United States Patent
Berusch et al.

(10) Patent No.: US 12,745,792 B2
(45) Date of Patent: Sep. 29, 2026

(54) REHEATABLE FOOD PRODUCT

(71) Applicants: Elana Berusch, Denver, CO (US); John Darcy, Denver, CO (US)

(72) Inventors: Elana Berusch, Denver, CO (US); John Darcy, Denver, CO (US)

(73) Assignee: Lily's Toaster Grills, LLC, Denver, CO (US)

( * ) Notice: Subject to any disclaimer, the term of this patent is extended or adjusted under 35 U.S.C. 154(b) by 0 days.

(21) Appl. No.: 18/594,619

(22) Filed: Mar. 4, 2024

(65) Prior Publication Data

US 2024/0389631 A1 Nov. 28, 2024

Related U.S. Application Data

(63) Continuation of application No. 18/057,498, filed on Nov. 21, 2022, now abandoned, which is a
(Continued)

(51) Int. Cl.
*A23P 20/20* (2016.01)
*A21D 13/28* (2017.01)
(Continued)

(52) U.S. Cl.
CPC ............. *A23P 20/20* (2016.08); *A21D 13/28* (2017.01); *A21D 13/32* (2017.01); *A23B 2/82* (2025.01); *A23D 7/0056* (2013.01)

(58) Field of Classification Search
CPC ......... A23P 20/10; A23P 20/105; A23P 20/11; A23P 20/12; A23P 20/15; A23P 20/17;
(Continued)

(56) References Cited

U.S. PATENT DOCUMENTS 4,963,376 A * 10/1990 Nafisi-Movaghar .... A23P 20/11 426/243
6,245,368 B1 6/2001 Sullivan et al.
(Continued)

OTHER PUBLICATIONS

Butter Powder NPL, published Oct. 7, 2019 <<https://cookingsauces.wordpress.com/2019/10/07/dehydrated-browned-butter-powder/>>.

(Continued)

*Primary Examiner* — Erik Kashnikow
*Assistant Examiner* — Bryan Kim
(74) *Attorney, Agent, or Firm* — GREENBERG TRAURIG, LLP

(57) ABSTRACT

A method for producing a reheatable food product includes mixing butter, maltodextrin and breadcrumbs so as to form a butter mixture, obtaining a first slice of bread and a second slice of bread, spreading the butter mixture onto a first surface of the first slice of bread and a first surface of the second slice of bread, applying 5 g to 70 g of a filling to the second surface of the first slice of bread, positioning the second slice of bread on the filling such that the second surface of the second slice of bread is adjacent thereto to form the food product, grilling the food product until the first
(Continued)

Figure 1 surfaces are golden brown, and compressing the food product to a thickness of 0.56 inches to 0.75 inches while grilling, freezing the food product to a frozen state, reheating the food product.

20 Claims, 3 Drawing Sheets

Related U.S. Application Data continuation of application No. 17/333,907, filed on May 28, 2021, now Pat. No. 11,517,038.

(51) Int. Cl.

| | |
|---|---|
| ***A21D 13/32*** | (2017.01) |
| ***A23B 2/82*** | (2025.01) |
| ***A23D 7/005*** | (2006.01) |

(58) Field of Classification Search

CPC .... A23P 20/18; A23P 20/20; A21D 13/11–14; A21D 13/17; A21D 13/19; A21D 13/22; A21D 13/24; A21D 13/28; A21D 13/31–32; A21D 15/02; A21D 17/006; A23D 7/0056; A23D 7/04; A23L 3/365; A23L 5/00; A23L 5/10–12

See application file for complete search history.

(56) References Cited

U.S. PATENT DOCUMENTS

| | | | | |
|---|---|---|---|---|
| 6,858,241 | B1 * | 2/2005 | Kershman .............. | A21D 13/26 426/94 |
| 11,517,038 | B1 * | 12/2022 | Berusch ................. | A21D 13/28 |
| 2005/0042332 | A1 * | 2/2005 | Lonergan ................ | A23P 20/12 426/94 |
| 2005/0175738 | A1 | 8/2005 | Howard et al. | |
| 2009/0155426 | A1 | 6/2009 | Gan et al. | |
| 2011/0159153 | A1 * | 6/2011 | Engstrom .............. | A21D 15/02 426/94 |
| 2012/0164296 | A1 | 6/2012 | Beck | |
| 2013/0295234 | A1 * | 11/2013 | Culp ...................... | A21D 13/32 426/94 |
| 2013/0313251 | A1 | 11/2013 | Barnoud et al. | |

OTHER PUBLICATIONS

YouTube NPL, published Sep. 23, 2020 <<https://www.youtube.com/watch?v=NQxALHFJpiE>>.

Tasty NPL, published Apr. 21, 2021 <<https://web.archive.org/web/20210421153420/https://tasty.co/recipe/pizza-toastie>>.

International Search Report and Written Opinion from International Application No. PCT/US2022/030679 dated Jun. 29, 2022.

* cited by examiner

REHEATABLE FOOD PRODUCT

CROSS REFERENCE TO RELATED APPLICATIONS

This application is a continuation of and claims the benefit of U.S. patent application Ser. No. 18/057,498, filed Nov. 21, 2022, which is a continuation of U.S. patent application Ser. No. 17/333,907, filed May 28, 2021, now U.S. Pat. No. 11,517,038, which are hereby incorporated by reference herein in their entirety.

FIELD OF THE INVENTION

The present disclosure relates generally to reheatable food items and methods for producing such reheatable food items. Specifically, the present disclosure relates to food items containing a filling therein that are reheatable in at least one of a toaster and a microwave from a refrigerated or frozen state.

BACKGROUND OF THE INVENTION

Food products that are prepared using a toaster or microwave are increasingly popular due to their convenience and quick cook times. Often, these food products contain a filling therein and are reheated from a frozen or refrigerated state. When reheating these food products, consumers enjoy a reheated food product that has the same taste and eating characteristics as a fresh product that does not require a toaster or microwave for reheating.

SUMMARY OF THE INVENTION

The summary is a high-level overview of various aspects of the invention and introduces some of the concepts that are further detailed in the Detailed Description section below. This summary is not intended to identify key or essential features of the claimed subject matter, nor is it intended to be used in isolation to determine the scope of the claimed subject matter. The subject matter should be understood by reference to the appropriate portions of the entire specification, any or all drawings, and each claim.

Embodiments of the present disclosure relate to a method for producing a reheatable food product. The method includes mixing butter and at least one dry ingredient so as to form a butter mixture. The butter mixture uses fat from a dairy source. The method also includes obtaining a first slice of bread and a second slice of bread. Each of the first slice of bread and the second slice of bread includes a first surface and a second, opposing surface. The method also includes spreading the butter mixture onto the first surface of the first slice of bread and the first surface of the second slice of bread. The butter mixture is spread to edges of the first surface of the first slice of bread and the first surface of the second slice of bread. The method also includes applying 5 g to 70 g of a filling to the second surface of the first slice of bread. The method also includes positioning the second slice of bread on the filling such that the second surface of the second slice of bread is adjacent thereto to form the food product. The method also includes grilling the food product until the first surfaces are golden brown. The method also includes compressing the food product to 0.6 inches to 1 inch while grilling. The method also includes freezing the food product to a frozen state. The method also includes reheating the food product. The food product does not consist essentially of butter on either the second surface of the first slice of bread or the second surface of the second slice of bread. The food product does not consist essentially of a sealant on either the second surface of the first slice of bread or the second surface of the second slice of bread.

In some embodiments, the at least one dry ingredient includes maltodextrin and breadcrumbs.

In some embodiments, the reheating includes toasting the food product for at least one cycle.

In some embodiments, the reheating includes microwaving the food product for 15 to 60 seconds.

In some embodiments, the reheating includes microwaving the food product for 15 to 60 seconds and toasting the food product.

In some embodiments, the butter mixture includes 60-90% of the salted butter by weight, 0.1-15% of the maltodextrin by weight and 10-20% of the breadcrumbs by weight.

In some embodiments, the mixing of the butter mixture includes mixing the maltodextrin and the breadcrumbs to form a dry blend and mixing the dry blend with the butter for 3 to 5 minutes.

In some embodiments, the butter mixture is heated to a temperature of 65° F. to 90° F.

In some embodiments, the food product is grilled at a temperature of 250° F. to 540° F. for 25 to 45 seconds.

In some embodiments, the food product is grilled on a clamshell grill, a belt grill, a panini press or a flat top grill.

In some embodiments, the filling comprises at least one of cheese, meat, egg, vegetable, sauce, spreads, fruit and combinations thereof.

In some embodiments, the method further includes wrapping the food product in a polyethylene plastic flow wrap or any food-grade wrapper impervious to moisture.

In some embodiments, the food product is cooled to a temperature of 60° F. to 140° F. prior to wrapping.

In some embodiments, the food product is frozen to a temperature of −25° F. to 25° F. prior to wrapping.

In some embodiments, the food product is frozen to a temperature of −25° F. to 25° F. after to wrapping.

BRIEF DESCRIPTION OF THE DRAWINGS

The accompanying drawings are included to provide a further understanding of the disclosure and are incorporated in and constitute a part of this specification, illustrate embodiments, and together with the description serve to explain the principles of the present disclosure.

DETAILED DESCRIPTION

Persons skilled in the art will readily appreciate that various aspects of the present disclosure can be realized by any number of methods and apparatus configured to perform the intended functions. It should also be noted that the accompanying figures referred to herein are not necessarily drawn to scale but may be exaggerated to illustrate various aspects of the present disclosure, and in that regard, the figures should not be construed as limiting.

Described herein are methods for producing a reheatable food product. Specifically, the present disclosure relates to methods for producing a reheatable food product in at least one of a toaster and a microwave. In some embodiments, the reheatable food product includes a filling therein. In some embodiments, the reheatable food product is reheated from a refrigerated or frozen state. In an exemplary embodiment, the reheatable food product is a sandwich.

Figure 1:
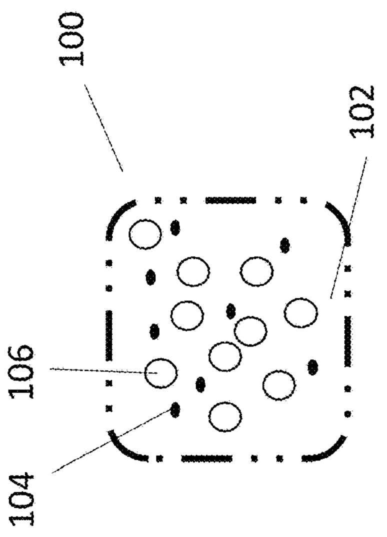
FIG. 1 is a perspective view of a butter mixture, according to embodiments of the present disclosure.
Figure 3:
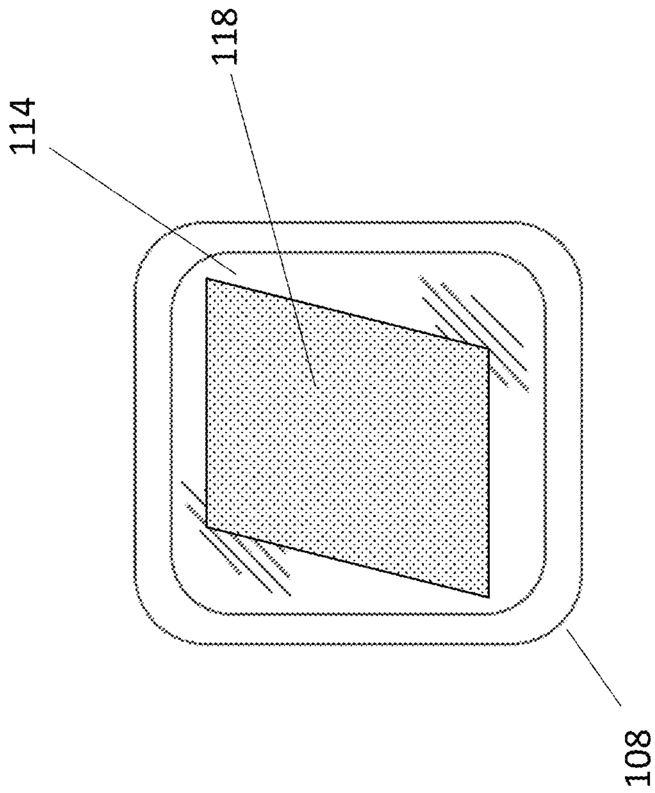
FIG. 3 is a top view of the first slice of bread with the filling applied to a second major surface thereof, according to embodiments of the present disclosure.

FIG. 1 depicts a first step of the method of producing the food product 10. In some embodiments, the method begins by forming a butter mixture 100. In some embodiments, the butter mixture 100 includes butter 102 and at least one dry ingredient. In some embodiments, the butter mixture 100 includes maltodextrin 104 and breadcrumbs 106 as dry ingredients. Other ingredients that may be included in the butter mixture 100 include, but are not limited to, sugar, egg, spices, oils, non-bread crumbs, nut butters, cheese, or a combination thereof. In some embodiments, the butter mixture 100 is formed by blending or mixing the maltodextrin 104 and the breadcrumbs 106 until well combined to form a dry mixture. The dry mixture is then combined with the butter 102 that has been warmed to room temperature. The dry mixture and the room temperature butter are, in some embodiments, mixed together at low speed for 3 to 5 minutes, until the dry blend is completely incorporated into the butter 102, forming the butter mixture 100.

In some embodiments, the butter mixture 100 includes 60-90% by weight butter. In other embodiments, the butter mixture 100 includes 60-85% by weight butter. In other embodiments, the butter mixture 100 includes 60-80% by weight butter. In other embodiments, the butter mixture 100 includes 60-75% by weight butter. In other embodiments, the butter mixture 100 includes 60-70% by weight butter. In other embodiments, the butter mixture 100 includes 60-65% by weight butter.

In some embodiments, the butter mixture 100 includes 65-90% by weight butter. In other embodiments, the butter mixture 100 includes 70-90% by weight butter. In other embodiments, the butter mixture 100 includes 75-90% by weight butter. In other embodiments, the butter mixture 100 includes 80-90% by weight butter. In other embodiments, the butter mixture 100 includes 85-90% by weight butter.

In some embodiments, the butter mixture 100 includes 65-85% by weight butter. In other embodiments, the butter mixture 100 includes 65-80% by weight butter. In other embodiments, the butter mixture 100 includes 70-80% by weight butter. In other embodiments, the butter mixture 100 includes 70-75% by weight butter. In other embodiments, the butter mixture 100 includes 75-85% by weight butter. In other embodiments, the butter mixture 100 includes 80-85% by weight butter.

In some embodiments, the butter mixture 100 includes 10-40% by weight dry ingredients. In other embodiments, the butter mixture 100 includes 10-35% by weight dry ingredients. In other embodiments, the butter mixture 100 includes 10-30% by weight dry ingredients. In other embodiments, the butter mixture 100 includes 10-25% by weight dry ingredients. In other embodiments, the butter mixture 100 includes 10-20% by weight dry ingredients. In other embodiments, the butter mixture 100 includes 10-15% by weight dry ingredients.

In some embodiments, the butter mixture 100 includes 15-40% by weight dry ingredients. In other embodiments, the butter mixture 100 includes 20-40% by weight dry ingredients. In other embodiments, the butter mixture 100 includes 25-40% by weight dry ingredients. In other embodiments, the butter mixture 100 includes 30-40% by weight dry ingredients. In other embodiments, the butter mixture 100 includes 35-40% by weight dry ingredients.

In some embodiments, the butter mixture 100 includes 15-35% by weight dry ingredients. In other embodiments, the butter mixture 100 includes 15-30% by weight dry ingredients. In other embodiments, the butter mixture 100 includes 15-25% by weight dry ingredients. In other embodiments, the butter mixture 100 includes 20-30% by weight dry ingredients. In other embodiments, the butter mixture 100 includes 25-35% by weight dry ingredients. In other embodiments, the butter mixture 100 includes 30-35% by weight dry ingredients.

In some embodiments, the dry ingredients include maltodextrin and breadcrumbs. In some embodiments, the butter mixture 100 includes 0.1-15% by weight maltodextrin. In other embodiments, the butter mixture 100 includes 0.5-15% by weight maltodextrin. In other embodiments, the butter mixture 100 includes 1-15% by weight maltodextrin. In other embodiments, the butter mixture 100 includes 5-15% by weight maltodextrin. In other embodiments, the butter mixture 100 includes 10-15% by weight maltodextrin.

In some embodiments, the butter mixture 100 includes 0.1-10% by weight maltodextrin. In other embodiments, the butter mixture 100 includes 0.1-5% by weight maltodextrin. In other embodiments, the butter mixture 100 includes 0.1-1% by weight maltodextrin. In other embodiments, the butter mixture 100 includes 0.1-0.5% by weight maltodextrin.

In some embodiments, the butter mixture 100 includes 0.5-10% by weight maltodextrin. In other embodiments, the butter mixture 100 includes 1-5% by weight maltodextrin. In other embodiments, the butter mixture 100 includes 1-10% by weight maltodextrin. In other embodiments, the butter mixture 100 includes 5-10% by weight maltodextrin. In other embodiments, the butter mixture 100 includes 0.5-5% by weight maltodextrin. In other embodiments, the butter mixture 100 includes 0.5-1% by weight maltodextrin.

In some embodiments, the butter mixture 100 includes 10-20% breadcrumbs. In other embodiments, the butter mixture 100 includes 12-20% breadcrumbs. In other embodiments, the butter mixture 100 includes 14-20% breadcrumbs. In other embodiments, the butter mixture 100 includes 16-20% breadcrumbs. In other embodiments, the butter mixture 100 includes 18-20% breadcrumbs.

In some embodiments, the butter mixture 100 includes 10-18% breadcrumbs. In other embodiments, the butter mixture 100 includes 10-16% breadcrumbs. In other embodiments, the butter mixture 100 includes 10-14% breadcrumbs. In other embodiments, the butter mixture 100 includes 10-12% breadcrumbs.

In some embodiments, the butter mixture 100 includes 12-18% breadcrumbs. In other embodiments, the butter mixture 100 includes 12-16% breadcrumbs. In other embodiments, the butter mixture 100 includes 12-14% breadcrumbs. In other embodiments, the butter mixture 100 includes 14-18% breadcrumbs. In other embodiments, the butter mixture 100 includes 14-16% breadcrumbs. In other embodiments, the butter mixture 100 includes 16-18% breadcrumbs.

In some embodiments, the butter 102 is fat from a dairy source. In some embodiments, the butter 102 is salted.

In some embodiments, the breadcrumbs 106 are toasted.

In some embodiments, once the butter mixture 100 is formed, it is held at a temperature of from 65° F. to 90° F. In other embodiments, the butter mixture 100 is held at a temperature of 65° F. to 85° F. In other embodiments, the butter mixture 100 is held at a temperature of 65° F. to 80° F. In other embodiments, the butter mixture 100 is held at a temperature of 65° F. to 75° F. In other embodiments, the butter mixture 100 is held at a temperature of 65° F. to 70° F.

In some embodiments, the butter mixture 100 is held at a temperature of 70° F. to 90° F. In other embodiments, the butter mixture 100 is held at a temperature of 75° F. to 90° F. In other embodiments, the butter mixture 100 is held at a temperature of 80° F. to 90° F. In other embodiments, the butter mixture 100 is held at a temperature of 85° F. to 90° F.

In some embodiments, the butter mixture 100 is held at a temperature of 70° F. to 80° F. In other embodiments, the butter mixture 100 is held at a temperature of 75° F. to 80° F. In other embodiments, the butter mixture 100 is held at a temperature of 80° F. to 85° F. In other embodiments, the butter mixture 100 is held at a temperature of 75° F. to 85° F.

Figure 2:
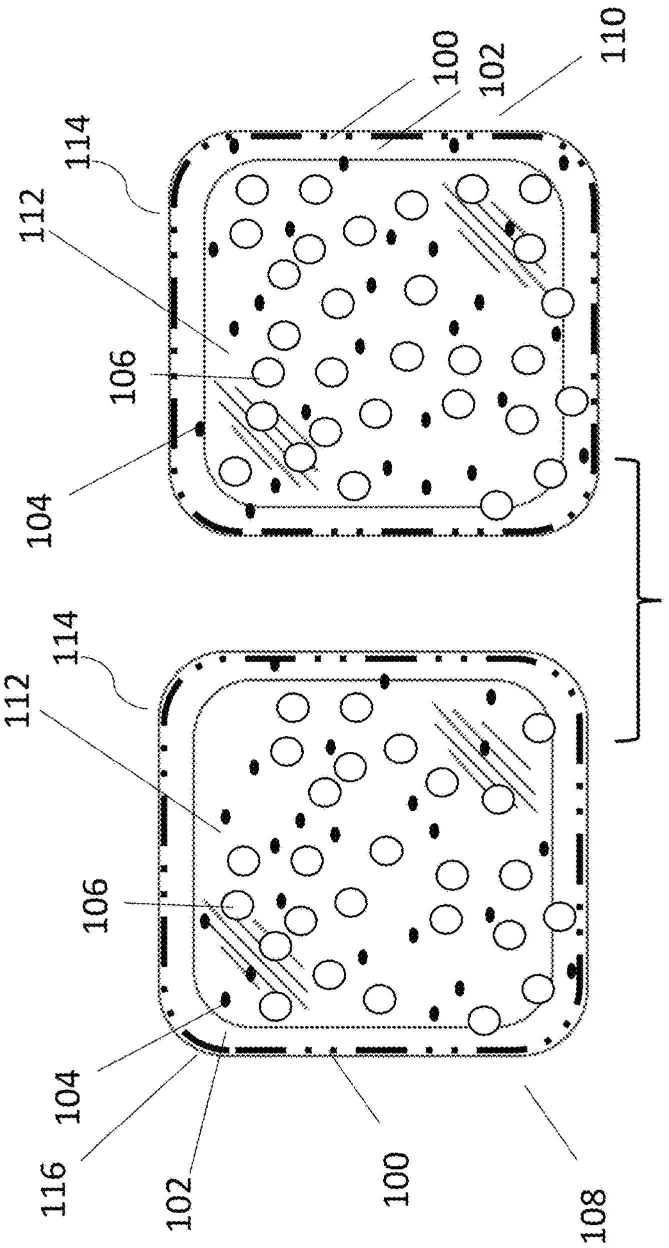
FIG. 2 is a top view of a first slice of bread and a second slice of bread, according to embodiments of the present disclosure.

Turning to FIG. 2, a first slice of bread 108 and a second slice of bread 110 are obtained. Each of the first slice of bread 108 and the second slice of bread 110 includes a first major surface 112 and an opposing second major surface 114. In some embodiments, each of the first slice of bread 108 and the second slice of bread 110 is 4 inches long by 4 inches wide. In some embodiments, however, the length and width of the bread can range from 3 in to 4.5 in. In other embodiments, the length and width of the bread can range from 3.4 in to 4.5 in. In other embodiments, the length and width of the bread can range from 3.8 in to 4.5 in. In other embodiments, the length and width of the bread can range from 4.2 in to 4.5 in.

In some embodiments, however, the length and width of the bread can range from 3 in to 4.2 in. In other embodiments, the length and width of the bread can range from 3 in to 4 in. In other embodiments, the length and width of the bread can range from 3 in to 3.8 in. In other embodiments, the length and width of the bread can range from 3 in to 3.4 in.

In some embodiments, however, the length and width of the bread can range from 3.5 in to 4 in. In other embodiments, the length and width of the bread can range from 3.6 in to 4.2 in. In other embodiments, the length and width of the bread can range from 3.8 in to 3.9 in. In other embodiments, the length and width of the bread can range from 4 in to 4.4 in. In other embodiments, the length and width of the bread can range from 3.2 in to 4.2 in.

In some embodiments, the first slice of bread 108 and the second slice of bread 110 are white bread. However, in other embodiments, any type of bread may be used including, but not limited to, bagels, tortillas, naan, etc.

Once the first slice of bread 108 and second slice of bread 110 are obtained, the butter mixture 100 is applied to the first major surface 112 of each of the first slice of bread 108 and the second slice of bread 110, as depicted in FIG. 2. In some embodiments, the butter mixture 100 is spread to each edge 116 of the first major surface 112, ensuring that the entire first major surface 112 is coated, as depicted in FIG. 2.

In some embodiments, 8 g to 12 g of the butter mixture 100 is applied to the first major surface 112 of each slice of bread. In other embodiments, 9 g to 12 g of the butter mixture 100 is applied to the first major surface 112. In other embodiments, 10 g to 12 g of the butter mixture 100 is applied to the first major surface 112. In other embodiments, 11 g to 12 g of the butter mixture 100 is applied to the first major surface 112.

In some embodiments, 8 g to 11 g of the butter mixture 100 is applied to the first major surface 112 of each slice of bread. In other embodiments, 8 g to 10 g of the butter mixture 100 is applied to the first major surface 112. In other embodiments, 8 g to 9 g of the butter mixture 100 is applied to the first major surface 112.

In some embodiments, 9 g to 11 g of the butter mixture 100 is applied to the first major surface 112 of each slice of bread. In other embodiments, 10 g to 11 g of the butter mixture 100 is applied to the first major surface 112. In other embodiments, 9 g to 10 g of the butter mixture 100 is applied to the first major surface 112.

In some embodiments, the butter mixture 100 is applied to the first and second slices of bread 108, 110 at the same temperatures provided above with respect to the holding of the butter mixture 100.

In some embodiments, no butter is applied to either the second major surface 114 of the first slice of bread 108 or the second major surface 114 of the second slice of bread 110. In some embodiments, the food product 10 does not consist essentially of butter on either the second surface major surface 114 of the first slice of bread 108 or the second surface 114 of the second slice of bread 110.

Figure 4:
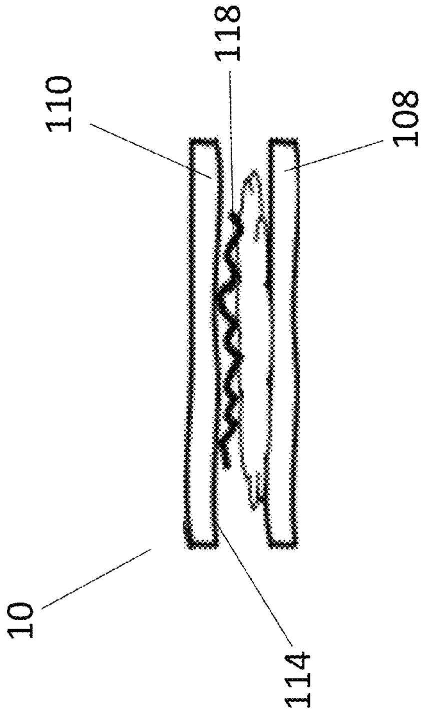
FIG. 4 is a cross-sectional view of a completed food product, according to embodiments of the present disclosure.

As depicted in FIG. 4, a filling 118 is then applied to the first slice of bread 108. To apply the filling 118, the first slice of bread 108 is flipped over so that the second major surface 114 thereof, which does not have the butter mixture 100 thereon, is exposed. The filling 118 is then, in some embodiments, deposited onto the second major surface 114 of the first slice of bread 108.

In some embodiments, the filling 118 comprises: cheese (hard, medium, soft, process, sliced, shredded), meat (cured, pre-cooked, extended, chopped, sliced, shredded), egg (patties, scrambled, raw), vegetable (raw, cooked, pickled), sauce (pesto, marinara, barbeque, cheese, ketchup, mustard, mayonnaise, Worcestershire, salad dressing, chocolate sauce, relish), spreads (cream cheese, nut butters, jellies, jams, marshmallow crème, hot fudge), fruit (raw, cooked, as jelly/jam/pie filling), and combinations thereof. In the exemplary embodiment of FIG. 4, pasteurized process cheese is applied to the bread.

In some embodiments, 5 g to 70 g of filling 118 is applied to the first slice of bread 108. In other embodiments, 5 g to 60 g of filling 118 is applied to the first slice of bread 108. In other embodiments, 5 g to 50 g of filling 118 is applied to the first slice of bread 108. In other embodiments, 5 g to 40 g of filling 118 is applied to the first slice of bread 108. In other embodiments, 5 g to 30 g of filling 118 is applied to the first slice of bread 108. In other embodiments, 5 g to 20 g of filling 118 is applied to the first slice of bread 108. In other embodiments, 5 g to 10 g of filling 118 is applied to the first slice of bread 108.

In some embodiments, 10 g to 70 g of filling 118 is applied to the first slice of bread 108. In other embodiments, 20 g to 70 g of filling 118 is applied to the first slice of bread 108. In other embodiments, 30 g to 70 g of filling 118 is applied to the first slice of bread 108. In other embodiments, 40 g to 70 g of filling 118 is applied to the first slice of bread 108. In other embodiments, 50 g to 70 g of filling 118 is applied to the first slice of bread 108. In other embodiments, 60 g to 70 g of filling 118 is applied to the first slice of bread 108.

In some embodiments, 10 g to 60 g of filling 118 is applied to the first slice of bread 108. In other embodiments, 20 g to 60 g of filling 118 is applied to the first slice of bread 108. In other embodiments, 30 g to 50 g of filling 118 is applied to the first slice of bread 108. In other embodiments, 30 g to 40 g of filling 118 is applied to the first slice of bread 108. In other embodiments, 50 g to 60 g of filling 118 is applied to the first slice of bread 108. In other embodiments, 40 g to 50 g of filling 118 is applied to the first slice of bread 108. In other embodiments, 40 g to 60 g of filling 118 is applied to the first slice of bread 108.

Figure 5:
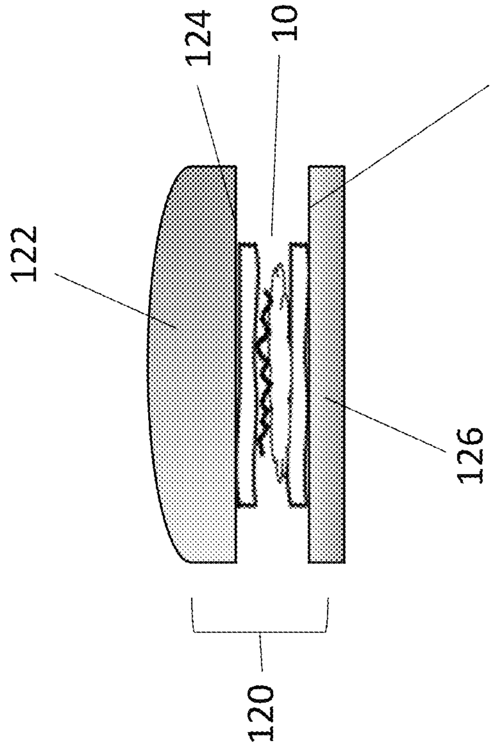
FIG. 5 is a diagrammatic perspective view of a grilling apparatus with the food product placed on a bottom grilling plate thereof, according to embodiments of the present disclosure.

After the filling 118 is applied to the first slice of bread 108, the food product 10 is formed by placing the second slice of bread 110 over the filling 118 such that the second major surface 114 of the second slice of bread 110 is adjacent to the filling 118, as depicted in FIG. 5. Thus, both exterior surfaces of the completed food product 10 are coated with the butter mixture 100.

Figure 6:
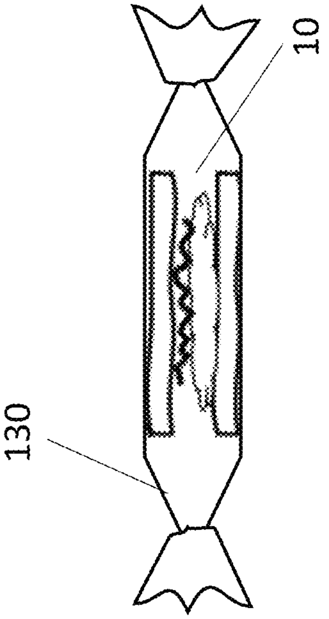
FIG. 6 is a perspective view of the food product in a wrapper.

Upon closing, the food product 10 is grilled on a grilling apparatus 120, as depicted in FIG. 6. In some embodiments, the grilling apparatus 120 includes a top grill plate 122 having a top grill surface 124 and a bottom grill plate 126 having a bottom grill surface 128. In some embodiments, the grilling apparatus 120 is configured to compress the food product 10. In some embodiments, the grilling apparatus 120 is a clamshell grill. However, in other embodiments, any type of grill may be used including, but not limited to, a belt grill, a panini press, a flat top grill and any other top and bottom gilling plate system that both compresses and heats both major surfaces of a food product 10.

In some embodiments, the grilling apparatus 120 is preheated until both the top and bottom grilling plates 122, 126 reach a temperature of 425° F. Although the grilling apparatus 120 of the current embodiment is heated to 540° F., in other embodiments, the grilling apparatus 120 is heated to any temperature from 250° F. to 540° F. In other embodiments, the grilling apparatus 120 is heated to a temperature of 250° F. to 500° F. In other embodiments, the grilling apparatus 120 is heated to a temperature of 250° F. to 450° F. In other embodiments, the grilling apparatus 120 is heated to a temperature of 250° F. to 400° F. In other embodiments, the grilling apparatus 120 is heated to a temperature of 250° F. to 350° F. In other embodiments, the grilling apparatus 120 is heated to a temperature of 250° F. to 300° F.

In other embodiments, the grilling apparatus 120 is heated to a temperature of 300° F. to 540° F. In other embodiments, the grilling apparatus 120 is heated to a temperature of 350° F. to 540° F. In other embodiments, the grilling apparatus 120 is heated to a temperature of 400° F. to 540° F. In other embodiments, the grilling apparatus 120 is heated to a temperature of 450° F. to 540° F. In other embodiments, the grilling apparatus 120 is heated to a temperature of 500° F. to 540° F.

In other embodiments, the grilling apparatus 120 is heated to a temperature of 300° F. to 350° F. In other embodiments, the grilling apparatus 120 is heated to a temperature of 300° F. to 400° F. In other embodiments, the grilling apparatus 120 is heated to a temperature of 300° F. to 450° F. In other embodiments, the grilling apparatus 120 is heated to a temperature of 300° F. to 500° F. In other embodiments, the grilling apparatus 120 is heated to a temperature of 350° F. to 400° F. In other embodiments, the grilling apparatus 120 is heated to a temperature of 350° F. to 450° F. In other embodiments, the grilling apparatus 120 is heated to a temperature of 350° F. to 500° F. In other embodiments, the grilling apparatus 120 is heated to a temperature of 400° F. to 450° F. In other embodiments, the grilling apparatus 120 is heated to a temperature of 400° F. to 500° F. In other embodiments, the grilling apparatus 120 is heated to a temperature of 450° F. to 500° F.

After the grilling apparatus 120 has been preheated, the food product 10 is placed on the bottom grill surface 128 of the bottom grill plate 126. The top grill plate 122 is then positioned onto the food product 10 in preparation for grilling. In some embodiments, the food product 10 is simultaneously grilled and compressed to a grilling apparatus compression thickness. Compressing the food product 10 ensures that the food product 10 stays intact throughout the production thereof and prevents filling from spilling out of the sides thereof. In some embodiments, the top and bottom grill plates are set to a plate compression of 0.6 in to 1 in such. In other embodiments, the grill plates are set to a plate compression of 0.7 in to 1 in. In other embodiments, the grill plates are set to a plate compression of 0.8 in to 1 in. In other embodiments, the grill plates are set to a plate compression of 0.9 in to 1 in.

In some embodiments, the grill plates are set to a plate compression of 0.6 in to 0.9 in. In other embodiments, the grill plates are set to a plate compression of 0.6 in to 0.8 in. In other embodiments, the grill plates are set to a plate compression of 0.6 in to 0.7 in.

In some embodiments, the grill plates are set to a plate compression of 0.7 in to 0.9 in. In other embodiments, the grill plates are set to a plate compression of 0.7 in to 0.8 in. In other embodiments, the grill plates are set to a plate compression of 0.8 in to 0.9 in.

In some embodiments, the food product 10 does not include a sealant on either the second major surface of the first slice of bread or the second major surface of the second slice of bread. In some embodiments, the food product 10 does not consist essentially of a sealant on either the second major surface of the first slice of bread or the second major surface of the second slice of bread.

In some embodiments, the food product 10 is grilled until golden brown for 25 seconds to 180 seconds, depending on the temperature of the grilling apparatus 120 and the required grilling characteristics of the finished food product 10. For example, a higher grilling temperature would require a shorter grill time, while a lower grilling temperature would require a longer grill time. In other embodiments, the food product 10 is grilled for 25 seconds to 180 seconds. In other embodiments, the food product 10 is grilled for 25 seconds to 120 seconds. In other embodiments, the food product 10 is grilled for 25 seconds to 100 seconds. In other embodiments, the food product 10 is grilled for 25 seconds to 60 seconds. In other embodiments, the food product 10 is grilled for 25 seconds to 35 seconds. In other embodiments, the food product 10 is grilled for 25 seconds to 30 seconds.

In some embodiments, the food product 10 is grilled for 30 seconds to 180 seconds. In other embodiments, the food product 10 is grilled for 35 seconds to 180 seconds. In other embodiments, the food product 10 is grilled for 60 seconds to 180 seconds. In other embodiments, the food product 10 is grilled for 100 seconds to 180 seconds. In other embodiments, the food product 10 is grilled for 120 seconds to 180 seconds.

In some embodiments, the food product 10 is grilled for 30 seconds to 120 seconds. In other embodiments, the food product 10 is grilled for 35 seconds to 100 seconds. In other embodiments, the food product 10 is grilled for 60 seconds to 120 seconds. In other embodiments, the food product 10 is grilled for 120 seconds to 160 seconds. In other embodiments, the food product 10 is grilled for 35 seconds to 45 seconds.

Grilling is completed upon achieving the desired appearance and eating characteristics of the food product 10. Once grilling is complete, the food product 10 is allowed to cool to a suitable surface temperature for wrapping in preparation for freezing. In some embodiments, the food product 10 is cooled to an temperature of 60° F. to 140° F. In other embodiments, the food product 10 is cooled to a temperature of 85° F. to 140° F. In other embodiments, the food product 10 is cooled to a temperature of 100° F. to 140° F. In other embodiments, the food product 10 is cooled to a temperature of 115° F. to 140° F. In other embodiments, the food product 10 is cooled to a temperature of 130° F. to 140° F.

In some embodiments, the food product 10 is cooled to an temperature of 60° F. to 130° F. In other embodiments, the food product 10 is cooled to a temperature of 60° F. to 115° F. In other embodiments, the food product 10 is cooled to a temperature of 60° F. to 100° F. In other embodiments, the food product 10 is cooled to a temperature of 60° F. to 85° F.

In some embodiments, the food product 10 is cooled to an temperature of 60° F. to 140° F. In other embodiments, the food product 10 is cooled to a temperature of 85° F. to 140° F. In other embodiments, the food product 10 is cooled to a temperature of 100° F. to 140° F. In other embodiments, the food product 10 is cooled to a temperature of 115° F. to 140° F. In other embodiments, the food product 10 is cooled to a temperature of 130° F. to 140° F.

In some embodiments, the food product 10 is then packaged or wrapped for freezing and storage, as depicted in FIG. 7. In some embodiments, the food product 10 is wrapped in a polyethylene plastic flow wrap 130. In other embodiments, the food product 10 is wrapped in any other food-grade wrapper that is impervious to moisture.

Once wrapped, the food product 10 is frozen for storage prior to retail sale, and thereafter stored frozen at a consumer's location. In some embodiments, the food product 10 is frozen to a temperature of −25° F. to 25° F. In other embodiments, the food product 10 is frozen to a temperature of −15° F. to 25° F. In other embodiments, the food product 10 is frozen to a temperature of −5° F. to 25° F. In other embodiments, the food product 10 is frozen to a temperature of 0° F. to 25° F. In other embodiments, the food product 10 is frozen to a temperature of 5° F. to 25° F. In other embodiments, the food product 10 is frozen to a temperature of 15° F. to 25° F. In other embodiments, the food product 10 is frozen to a temperature of 20° F. to 25° F.

In some embodiments, the food product 10 is frozen to a temperature of −25° F. to 20° F. In other embodiments, the food product 10 is frozen to a temperature of −25° F. to 15° F. In other embodiments, the food product 10 is frozen to a temperature of −25° F. to 10° F. In other embodiments, the food product 10 is frozen to a temperature of −25° F. to 5° F. In other embodiments, the food product 10 is frozen to a temperature of −25° F. to 0° F. In other embodiments, the food product 10 is frozen to a temperature of −25° F. to −5° F. In other embodiments, the food product 10 is frozen to a temperature of −25° F. to −10° F. In other embodiments, the food product 10 is frozen to a temperature of −25° F. to −15° F.

In some embodiments, the food product 10 is frozen to a temperature of −20° F. to 20° F. In other embodiments, the food product 10 is frozen to a temperature of −15° F. to 15° F. In other embodiments, the food product 10 is frozen to a temperature of −10° F. to 10° F. In other embodiments, the food product 10 is frozen to a temperature of −55° F. to 5° F. In other embodiments, the food product 10 is frozen to a temperature of −5° F. to 0° F. In other embodiments, the food product 10 is frozen to a temperature of 0° F. to 5° F. In other embodiments, the food product 10 is frozen to a temperature of 5° F. to 20° F. In other embodiments, the food product 10 is frozen to a temperature of 15° F. to 20° F.

In some embodiments, the food product 10 is cooled to a freezing temperature prior to wrapping. The food product 10 can be frozen to any of the freezing temperatures described above.

When a consumer wishes to cat the food product 10, the consumer removes the food product 10 from the wrapper. The food product 10 is then reheated by microwaving, toasting or a combination of microwaving and toasting. In some embodiments, the food product 10 is only toasted for one cycle at a medium or high setting. In other embodiments, the food product 10 is microwaved for 30 seconds and subsequently toasted for one cycle at a medium or high setting. In other embodiments, the food product 10 is toasted for more than one cycle, or as necessary to heat the food product 10 to a degree desired by the consumer. In some embodiments, the food product 10 is microwaved for 15-60 seconds. In other embodiments, the food product 10 is microwaved for 30-60 seconds. In other embodiments, the food product 10 is microwaved for 45-60 seconds.

In some embodiments, the food product 10 is microwaved for 15-45 seconds. In other embodiments, the food product 10 is microwaved for 15-30 seconds. In some embodiments, the food product 10 is microwaved for 30-45 seconds.

In some embodiments, the consumer can store the food product 10 in the fridge to bypass the microwave step.

The butter mixture 100 applied to the exterior surfaces of the food product 10, as described above, provides many benefits during the grilling, freezing and reheating steps of producing the food product 10. First, the breadcrumbs 106 improve the appearance and texture of the food product 10 after grilling and reheating. Specifically, toasted breadcrumbs 106 provide a crisp exterior to the product after toasting. Second, the breadcrumbs 106, along with the butter 102, when applied to the surfaces of the slices of bread, move into and fill the pores of the slices of bread, which allows for enhanced heat transfer from the exterior of the food product 10 to the filling within the food product 10. This enhanced heat transfer prevents burning or scorching of the exterior of the food product 10 prior to the inner filling being warmed. Third, the butter mixture 100 provides a lipid layer that, when cooled, prevents migration of moisture from the interior of the product to the exterior, thus preventing freezer burn during the freezing step. Fourth, the composition of the butter coating also provides product robustness when undergoing multiple heating and cooling cycles, resulting in a fresh-tasting product after freezing and preparation. Finally, the breadcrumbs enhance the flavor and color of the food product 10.

EXAMPLE

A blind taste test was performed comparing two reheatable grilled cheese sandwiches. A first reheatable grilled cheese sandwich was prepared according to the method described in the current disclosure. The second reheatable grilled cheese sandwich was prepared according to the method disclosed in U.S. Pat. No. 6,858,241 to Kershman et al. Thirty study panelists were asked thirty-four questions regarding which sandwich of the two sandwiches had preferred appearance, texture and taste.

The questions and response provided in Table 1.

TABLE 1

| Question | '241 Patent Sandwich | Current Sandwich |
|---|---|---|
| Evaluate both of the frozen sandwiches by looking at them and picking them up. Answer each question by checking the box that corresponds to your chosen sandwich. | | |
| 1. Which sandwich color do you prefer? | 0 | 30 |
| 2. Which sandwich surface appearance do you prefer? | 2 | 28 |
| 3. When you touch the sandwiches, which sandwich's texture do you prefer? | 6 | 24 |
| 4. When you touch the sandwiches, which sandwich feels less greasy? | 14 | 15 |
| 5. Which sandwich looks less messy? | 8 | 21 |
| 6. Which sandwich thickness do you prefer? | 1 | 29 |
| 7. Which sandwich looks more appetizing? | 1 | 29 |
| 8. Which sandwich looks more homemade? | 3 | 27 |
| 9. Which sandwich looks less greasy? | 21 | 9 |
| 10. Which sandwich would you rather serve to your family? | 1 | 29 |
| 11. Which sandwich would you be more likely to buy? | 1 | 29 |
| Evaluate both prepared sandwiches by looking at them. Do not taste them at this stage. Answer each question by checking the box that corresponds to your chosen sandwich. | | |
| 12. Which sandwich color do you prefer? | 2 | 28 |
| 13. Which sandwich surface appearance do you prefer? | 4 | 26 |
| 14. Which sandwich looks less messy? | 8 | 21 |
| 15. Which sandwich looks more appetizing? | 3 | 27 |
| 16. Which sandwich looks more homemade? | 7 | 23 |
| 17. Which sandwich looks less greasy? | 22 | 7 |
| 18. Which sandwich thickness do you prefer? | 2 | 28 |
| Evaluate both prepared sandwiches by touching them and picking them up. Do not taste them at this stage. Answer each question by checking the box that corresponds to your chosen sandwich. | | |
| 19. When you touch the sandwiches, which sandwich's texture do you prefer? | 10 | 20 |
| 20. When you touch the sandwiches, which sandwich feels more homemade? | 7 | 34 |
| 21. When you touch the sandwiches, which sandwich feels less greasy? | 16 | 14 |
| 22. Which sandwich would you rather serve to your family? | 3 | 27 |
| 23. Which sandwich are you more likely to buy? | 2 | 28 |
| Taste both sandwiches. Answer each question by checking the box that corresponds to your chosen sandwich. | | |
| 24. Which sandwich is less greasy? | 21 | 9 |
| 25. Which sandwich has a better cheese flavor? | 9 | 21 |
| 26. Which sandwich has a better butter flavor? | 5 | 25 |
| 27. Which sandwich has a better aftertaste? | 8 | 22 |
| 28. Which sandwich is crispier? | 9 | 21 |
| 29. Which sandwich thickness do you prefer? | 4 | 26 |
| 30. Which sandwich is more satisfying? | 5 | 25 |
| 31. Which sandwich is less messy to eat? | 4 | 24 |

TABLE 1-continued

| Question | '241 Patent Sandwich | Current Sandwich |
|---|---|---|
| 32. Which sandwich tastes more homemade? | 7 | 22 |
| 33. Which sandwich would you rather serve to your family? | 6 | 24 |
| 34. Which sandwich are you more likely to buy? | 6 | 24 |

As depicted in Table 1, the reheatable grilled cheese that was produced according to the disclosed method was overwhelmingly preferred by the study panelists in every characteristic. Using a significance level of 0.01, the level of preference for the reheatable sandwich made according to the disclosed method was far below the significance level (0.000000476), denoting a very strong statistically significant difference between the two samples presented. A statistical analysis of the results is provided in Table 2.

TABLE 2 t-Test Results Showing Statistical Difference Between the Mean Calculation of Two Samples

| | 241 Patent Product | Current Product |
|---|---|---|
| Observations | 34 | 34 |
| Mean of observations | 6.71 | 23.09 |
| Significant difference | p < .01 | |

The disclosure of this application has been described above both generically and with regard to specific embodiments. It will be apparent to those skilled in the art that various modifications and variations can be made in the embodiments without departing from the scope of the disclosure. Thus, it is intended that the embodiments cover the modifications and variations of this invention provided they come within the scope of the appended claims and their equivalents.

What is claimed is:

1. A method, comprising:

forming a butter mixture,
  wherein the butter mixture consists of:
    70% to 80% of the butter by weight;
    5% to 10% of maltodextrin by weight; and
    10% to 16% of breadcrumbs by weight;

obtaining a first slice of bread and a second slice of bread,
  wherein each of the first slice of bread and the second slice of bread comprises a first surface and an opposing second surface;

spreading the butter mixture onto the first surface of the first slice of bread and the first surface of the second slice of bread,
  wherein the butter mixture, when applied to the first surface of the first slice of bread and the first surface of the second slice of bread, move into and fill pores of the slices of bread;

applying 5 g to 70 g of a filling to the second surface of the first slice of bread;

positioning the second slice of bread on the filling such that the second surface of the second slice of bread is adjacent to the filling, thereby forming a food product;

grilling the food product on a direct thermal heat grilling apparatus, wherein the butter mixture in the pores of the slices of bread provide heat transfer from an exterior of the food product to the filling within the food product;

compressing the food product while grilling to form a compressed food product; and freezing the compressed food product to a frozen state so as to result in a reheatable food product, wherein the reheatable food product does not include butter on either the second surface of the first slice of bread or the second surface of the second slice of bread, and wherein the reheatable food product does not comprise a sealant on either the second surface of the first slice of bread or the second surface of the second slice of bread.

2. The method of claim 1, wherein the compressing comprises compressing the food product to a thickness of 0.6 inch to 1 inch while grilling.

3. The method of claim 2, wherein the grilling comprises grilling for 25 seconds to 45 seconds.

4. The method of claim 1, wherein the filling comprises at least one of cheese, meat, egg, vegetable, sauce, spread, or fruit.

5. A method, comprising:

forming a butter mixture, wherein the butter mixture consists of:

70% to 80% of the butter by weight;

5% to 10% of maltodextrin by weight; and

10% to 16% of breadcrumbs by weight;

obtaining a first slice of bread and a second slice of bread, wherein each of the first slice of bread and the second slice of bread comprises a first surface and an opposing second surface;

applying 5 g to 70 g of a filling to the second surface of the first slice of bread;

positioning the second slice of bread on the filling such that the second surface of the second slice of bread is adjacent to the filling, thereby forming a food product;

spreading the butter mixture onto the first surface of the first slice of bread and the first surface of the second slice of bread, wherein the butter mixture, when applied to the first surface of the first slice of bread and the first surface of the second slice of bread, move into and fill pores of the slices of bread;

grilling the food product on a direct thermal heat grilling apparatus, wherein the butter mixture in the pores of the slices of bread provide heat transfer from an exterior of the food product to the filling within the food product;

compressing the food product to a thickness of 0.6 inch to 1 inch while grilling to form a compressed food product; and freezing the compressed food product to a frozen state so as to result in a reheatable food product, wherein the reheatable food product does not include butter on either the second surface of the first slice of bread or the second surface of the second slice of bread, and wherein the reheatable food product does not comprise a sealant on either the second surface of the first slice of bread or the second surface of the second slice of bread.

6. The method of claim 5, wherein the grilling comprises grilling at a temperature of 250° F. to 540° F.

7. The method of claim 6, wherein the grilling comprises grilling for 25 seconds to 45 seconds.

8. The method of claim 5, wherein the filling comprises at least one of cheese, meat, egg, vegetable, sauce, spreads, or fruit.

9. A method, comprising:

providing a food product, wherein the food product comprises:

a first slice of bread including:

a first surface of the first slice of bread, and a second surface opposite the first surface of the first slice of bread, a second slice of bread including:

a first surface of the second slice of bread, and a second surface opposite the first surface of the second slice of bread, a filling between the second surface of the first slice of bread and the second surface of the second slice of bread, and a butter mixture on the first surface of the first slice of bread and the first surface of the second slice of bread, wherein the butter mixture consists of:

70% to 80% fat from a dairy source by weight,

5% to 10% maltodextrin by weight, and

10% to 16% breadcrumbs by weight, wherein the butter mixture, when applied to the first surface of the first slice of bread and the first surface of the second slice of bread, move into and fill pores of the slices of bread;

compressing the food product to form a compressed food product;

grilling the compressed food product on a direct thermal heat grilling apparatus, wherein the butter mixture in the pores of the slices of bread provide heat transfer from an exterior of the food product to the filling within the food product; and freezing the grilled and compressed food product to a frozen state so as to result in a reheatable food product, wherein the food product does not include butter on either the second surface of the first slice of bread or the second surface of the second slice of bread, and wherein the food product does not comprise a sealant on either the second surface of the first slice of bread or the second surface of the second slice of bread.

10. The method of claim 9, wherein the grilling comprises grilling at a temperature of 250° F. to 540° F.

11. The method of claim 10, wherein the grilling comprises grilling for 25 seconds to 45 seconds.

12. The method of claim 9, wherein the filling comprises at least one of cheese, meat, egg, vegetable, sauce, spreads, or fruit.

13. A method, comprising:

providing a food product, wherein the food product comprises:

a first slice of bread including:

a first surface of the first slice of bread, and a second surface opposite the first surface of the first slice of bread, a second slice of bread including:

a first surface of the second slice of bread, and a second surface opposite the first surface of the second slice of bread, a filling between the second surface of the first slice of bread and the second surface of the second slice of bread, and a butter mixture on the first surface of the first slice of bread and the first surface of the second slice of bread, wherein the butter mixture consists of:

70% to 80% fat from a dairy source by weight,

5% to 10% maltodextrin by weight, and

10% to 16% breadcrumbs by weight, wherein the butter mixture, when applied to the first surface of the first slice of bread and the first surface of the second slice of bread, move into and fill pores of the slices of bread;

grilling the food product on a direct thermal heat grilling apparatus, wherein the butter mixture in the pores of the slices of bread provide heat transfer from an exterior of the food product to the filling within the food product;

compressing the food product while grilling to form a compressed food product; and freezing the compressed food product to a frozen state so as to result in a reheatable food product, wherein the food product does not include butter on either the second surface of the first slice of bread or the second surface of the second slice of bread, and wherein the food product does not comprise a sealant on either the second surface of the first slice of bread or the second surface of the second slice of bread.

14. The method of claim 13, wherein the grilling comprises grilling at a temperature of 250° F. to 540° F.

15. The method of claim 14, wherein the grilling comprises grilling for 25 seconds to 45 seconds.

16. The method of claim 13, wherein the filling comprises at least one of cheese, meat, egg, vegetable, sauce, spreads, or fruit.

17. A method, comprising:

obtaining a first slice of bread and a second slice of bread, wherein each of the first slice of bread and the second slice of bread comprises a first surface and an opposing second surface;

forming a butter mixture, wherein the butter mixture uses fat from a dairy source;

wherein the butter mixture consists of:

70% to 80% of the fat by weight;

5% to 10% of maltodextrin by weight; and

10% to 16% of breadcrumbs by weight;

applying 5 g to 70 g of a filling to the second surface of the first slice of bread;

positioning the second slice of bread on the filling such that the second surface of the second slice of bread is adjacent to the filling, thereby forming a food product;

spreading the butter mixture onto the first surface of the first slice of bread and the first surface of the second slice of bread, wherein the butter mixture, when applied to the first surface of the first slice of bread and the first surface of the second slice of bread, move into and fill pores of the slices of bread;

grilling the food product on a direct thermal heat grilling apparatus, wherein the butter mixture in the pores of the slices of bread provide heat transfer from an exterior of the food product to the filling within the food product;

compressing the food product to a thickness of 0.6 inch to 1 inch while grilling; and freezing the food product to a frozen state so as to result in a reheatable food product, wherein the reheatable food product does not include butter on either the second surface of the first slice of bread or the second surface of the second slice of bread, and wherein the reheatable food product does not comprise a sealant on either the second surface of the first slice of bread or the second surface of the second slice of bread.

18. The method of claim 17, wherein the grilling comprises grilling at a temperature of 250° F. to 540° F.

19. The method of claim 18, wherein the grilling comprises grilling for 25 seconds to 45 seconds.

20. The method of claim 17, wherein the filling comprises at least one of cheese, meat, egg, vegetable, sauce, spreads, or fruit.

* * * * *